(12) United States Patent
Hallendorff et al.

(10) Patent No.: US 11,186,007 B2
(45) Date of Patent: Nov. 30, 2021

(54) OIL RESERVOIR FOR CHAINSAW WITH PRESSURE RELEASING VALVE

(71) Applicant: Husqvarna AB, Huskvarna (SE)

(72) Inventors: Johan Hallendorff, Jönköping (SE);
Joakim Persson, Skillingaryd (SE);
Jonas Ingemarsson, Stockholm (SE);
Jonatan Gunér, Huskvarna (SE)

(73) Assignee: Husqvarna AB, Huskvarna (SE)

( * ) Notice: Subject to any disclaimer, the term of this patent is extended or adjusted under 35 U.S.C. 154(b) by 613 days.

(21) Appl. No.: 14/439,796

(22) PCT Filed: Oct. 31, 2013

(86) PCT No.: PCT/SE2013/051272
§ 371 (c)(1),
(2) Date: Apr. 30, 2015

(87) PCT Pub. No.: WO2014/070090
PCT Pub. Date: May 8, 2014

(65) Prior Publication Data
US 2015/0298344 A1    Oct. 22, 2015

(30) Foreign Application Priority Data

Oct. 31, 2012 (WO) ................. PCT/SE2012/501184

(51) Int. Cl.
*B27B 17/12* (2006.01)
*F16N 19/00* (2006.01)

(52) U.S. Cl.
CPC .............. *B27B 17/12* (2013.01); *F16N 19/00* (2013.01)

(58) Field of Classification Search
CPC ... B27B 17/12; B27B 17/0008; B27B 17/086; F16N 19/00; A01G 3/08; B23P 19/04
See application file for complete search history.

(56) References Cited

U.S. PATENT DOCUMENTS

| 2,748,810 | A | * | 6/1956 | Strunk | ................... B27B 17/12 30/123.4 |
| 2,883,000 | A | | 4/1959 | Mattson | |
| 2,986,159 | A | * | 5/1961 | Snyder | ................... F16K 17/19 137/493 |

(Continued)

FOREIGN PATENT DOCUMENTS

| DE | 2440397 A1 | 3/1976 |
| EP | 0180742 A1 | 5/1986 |

(Continued)

OTHER PUBLICATIONS

International Search Report and Written Opinion of PCT/SE2013/051272 dated Feb. 18, 2014, all enclosed pages cited.

(Continued)

*Primary Examiner* — Kenneth E Peterson
*Assistant Examiner* — Liang Dong
(74) *Attorney, Agent, or Firm* — Burr & Forman, LLP

(57) ABSTRACT

A chainsaw (100) includes a power unit, a bar (120), a chain (122) operably coupled to the bar (120) to rotate around the bar (120) responsive to drive power from the power unit, an oil pump operably coupled to the power unit to deliver oil to the chain (122), and an oil 420 reservoir (400) configured to hold oil for delivery to the chain (122) via the oil pump. The oil reservoir (400) may include a main chamber (410) to receive the oil and an air chamber (420). The air chamber (420) may be formed adjacent to and distinct from the main chamber (410). The air chamber (420) is configured to define a space for an air pocket.

15 Claims, 12 Drawing Sheets

(56) References Cited

U.S. PATENT DOCUMENTS

| | | | |
|---|---|---|---|
| 3,372,679 A | | 3/1968 | Aitken |
| 4,760,646 A | | 8/1988 | Siegler |
| 5,056,493 A | | 10/1991 | Holzer |
| 5,653,028 A | * | 8/1997 | Hashimoto ............. B27B 17/12 30/123.4 |
| 5,676,115 A | | 10/1997 | Linsbauer et al. |
| 5,718,050 A | * | 2/1998 | Keller ...................... A01G 3/08 16/DIG. 12 |
| 5,725,016 A | | 3/1998 | Nickel |
| 5,738,064 A | * | 4/1998 | Lowe ..................... B27B 17/00 123/198 E |
| 5,896,669 A | | 4/1999 | Uhl |
| 6,116,271 A | | 9/2000 | Nickel |
| 6,787,028 B2 | * | 9/2004 | Uhl ........................ B27B 17/00 210/171 |
| 2012/0061393 A1 | | 3/2012 | Okouchi |

FOREIGN PATENT DOCUMENTS

| | | |
|---|---|---|
| EP | 0847840 A2 | 6/1998 |
| EP | 2145699 A1 | 1/2010 |
| JP | S5926328 A | 2/1984 |
| JP | 2000317902 A | 11/2000 |
| KR | 100535076 B1 | 12/2005 |

OTHER PUBLICATIONS

International Search Report and Written Opinion of PCT/SE2012/051184 dated Jul. 17, 2013, all enclosed pages cited.

* cited by examiner

OIL RESERVOIR FOR CHAINSAW WITH PRESSURE RELEASING VALVE

TECHNICAL FIELD

Example embodiments generally relate to chainsaws and, more particularly, relate to a chainsaw provided with a chain oiling assembly that is configured to reduce oil leakage.

BACKGROUND

A chainsaw is typically provided with an oil reservoir and an oil pump that draws oil from the reservoir to lubricate the chain. In many cases, the oil reservoir can be filled with oil via a reservoir opening that is covered by an externally visible and removable cap. Meanwhile, the oil pump draws oil from the reservoir via a reservoir exit. In many cases, a flexible hose may be provided to draw the oil from the oil reservoir to the oil pump. The oil pump in a fuel operated chainsaw may be driven off the clutch drum via a worm gear to supply oil through a canal that connects to a portion of the chain bar and into a groove that extends around a periphery of the chain bar. In the context of an electrically powered chainsaw, the oil pump could be driven from an output shaft of a main electric motor that is driving the chain. Alternatively, the oil pump could be driven by a separate smaller electric motor which is also powered by the battery of the product.

The chain will pick up the oil as the chain moves around the groove and this oiling of the chain generally keeps the chainsaw in good working order. However, when the chainsaw is stored for a period of time, it is not uncommon for some oil to leak, and this leakage can stain surfaces or concern operators that there is a problem with the lubrication system. Although these reactions are understandable, the phenomena can occur without any fault existing in the chainsaw. Instead, since the oil pump is generally not engineered to be 100% free of leakage, any air that is in the oil reservoir can tend to expand and contract with changes in temperature. Accordingly, if the air that is in the tank expands due to heating of the storage environment over the course of a day, the oil in the oil reservoir may essentially be pushed or pumped through the pump and into the canal mentioned above. This oil may then drip out, even though the chainsaw is otherwise in normal working condition.

Accordingly, there may be a need for an arrangement providing for chain oiling that may at least reduce the likelihood of having oil escape from the oil reservoir.

BRIEF SUMMARY OF SOME EXAMPLES

Some example embodiments may therefore provide a chain oiling mechanism that includes an oil reservoir that includes a main chamber for receiving oil, and an air chamber for providing an air cavity. The air cavity of some embodiments may be provided at a location that is higher in elevation than the main chamber for multiple different orientations in which storage of the chainsaw may commonly be expected.

In one example embodiment, a chainsaw is provided. The chainsaw includes a power unit, a bar, a chain operably coupled to the bar to rotate around the bar responsive to drive power from the power unit, an oil pump operably coupled to the power unit to deliver oil to the chain, and an oil reservoir configured to hold oil for delivery to the chain via the oil pump. The oil reservoir may include a main chamber to receive the oil and an air chamber. The air chamber may be formed adjacent to and distinct from the main chamber. The air chamber is configured to define a space for an air pocket.

In another example embodiment, a chainsaw oil reservoir is provided. The oil reservoir may provide chain oil to an oil pump of a chainsaw. The oil reservoir may include a main chamber configured to receive and store the oil, and an air chamber formed adjacent to and distinct from the main chamber. The air chamber may be in communication with the main chamber to define a space for an air pocket.

Some example embodiments may provide a way to reduce the likelihood of experiencing any oil leakage when a chainsaw is stored in an environment in which pressure changes are likely to be encountered.

The oil reservoir may further include at least one breather structure that may be disposed in the air chamber. The breather structure may include a valve housing which may house a pressure relief valve such as a check valve. The check valve may be set to allow pressure to be relieved from the air chamber when the pressure in the air chamber exceeds a predetermined value. However, before the predetermined value is reached, the check valve may remain shut. Meanwhile, the check valve may not allow any flow in the reverse direction into the air chamber. In an example embodiment, the check valve may relieve pressure inside a casing of a chainsaw. However, in some cases, the check valve may be constructed to relieve pressure outside of the casing. Since it is possible that the chainsaw may be oriented during storage in an orientation that causes the oil reservoir to fill with oil (e.g., upside down), the valve housing may be in communication with a duct, hose or other conduit by which to transfer any fluid that is released through the check valve to a particular location relative to the chainsaw (e.g., the bottom thereof).

Preferably, the breather structure defines a fluid passage connecting the interior of the air chamber and includes a pipe, duct, hose or other conduit. The valve is provided in the fluid passage, at a distance from the air chamber along the fluid passage, and is configured to control the fluid flow through the fluid passage. The valve may be a check valve in the form of either a one-way air inlet valve or a one-way pressure relief valve, or a bi-directional valve. Further, the breather structure preferably is arranged so as to project beyond the surrounding exterior surface of the air chamber. The valve may be located in the fluid passage between the air chamber and a distal end of the breather structure relative to the air chamber, wherein the distal end of the fluid passage may be open to ambient air. Preferably, the valve is located in the area of the distal end of the breather structure relative to the air chamber, or at least closer to the distal end than to the air chamber along the fluid passage. The distal end may be located inside the casing of the chainsaw, such as at a bottom of the chainsaw. Preferably, the valve is provided at a location lower in elevation than the position where the fluid passage meets the interior of the air chamber in a normal upright orientation of the chainsaw. The normal upright orientation being the orientation of the chainsaw when it is resting with its underside in contact with a horizontal surface. Suitably, the breather structure may include a flexible hose of a rubber or plastic material. In one embodiment two or more breather structures may be provided, so as to form at least two fluid passages, preferably two fluid passages. As an alternative the breather structure may be split a distance from the air chamber along the fluid passage into two or more separate fluid passages, such as a first and a second fluid passage, of which at least one may be provided with the valve. Preferably, in case of two separate fluid passages (or in case of two passages resulting from said split), each one of the two fluid passages may be provided with a check valve, of which a first (air inlet valve) may be a check valve only allowing fluid flow in a direction towards the oil reservoir, and the other one (pressure relief valve) only allowing fluid flow in a direction away from the oil reservoir.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 1:
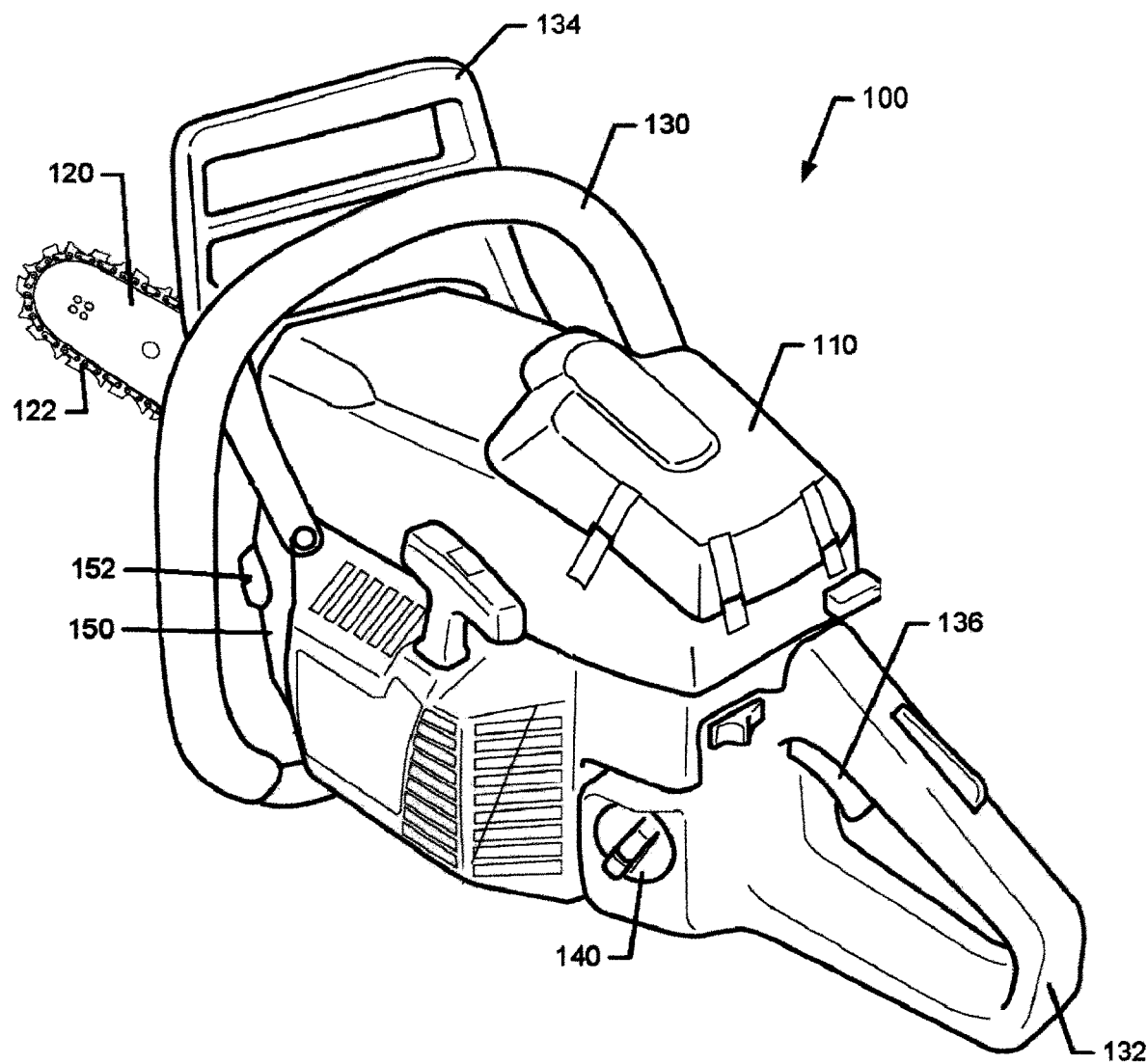
FIG. 1 illustrates a perspective view of a chainsaw according to an example embodiment.
Figure 2:
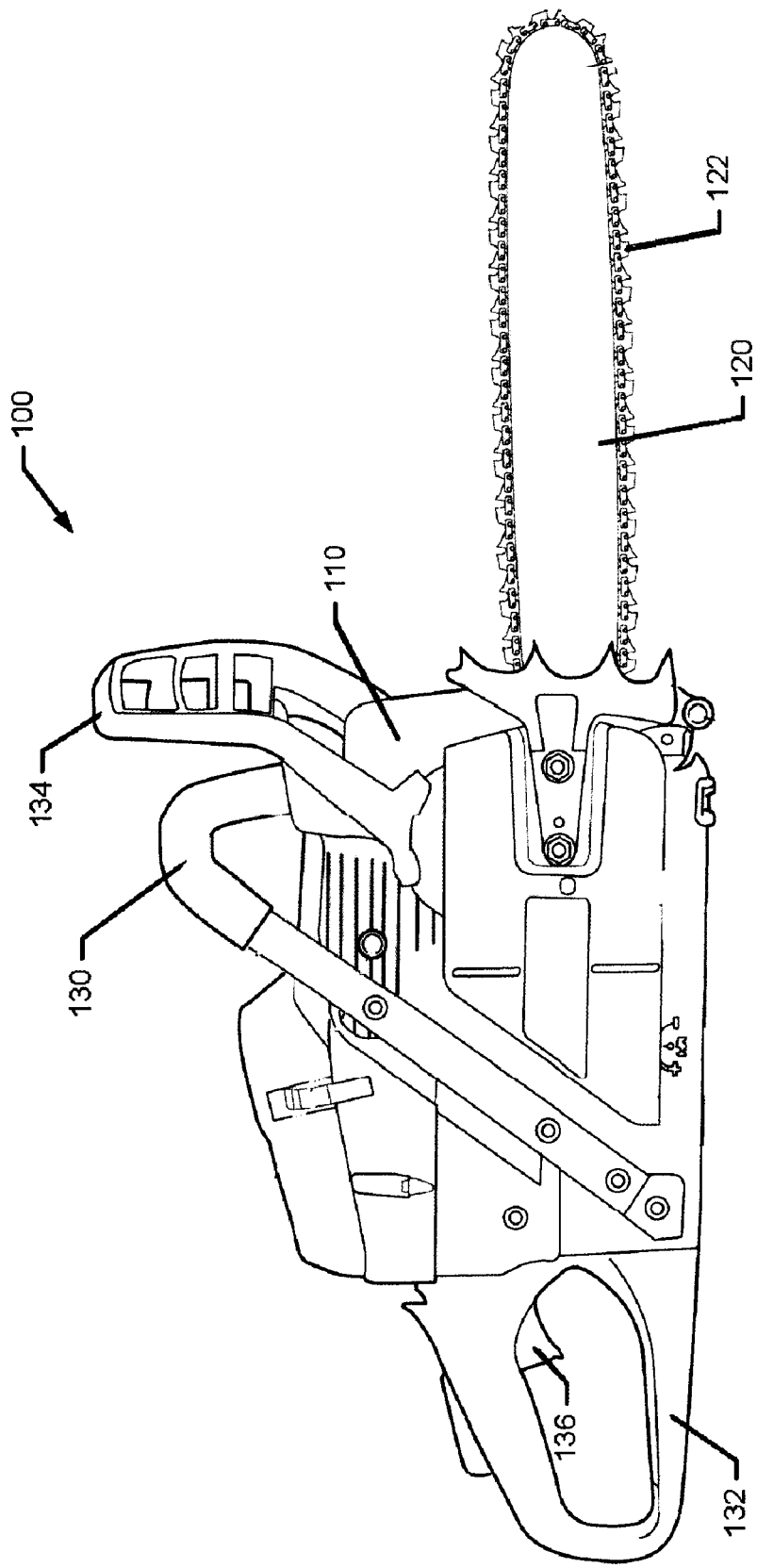
FIG. 2 illustrates a side view of the chainsaw from the opposite side of that which is shown in FIG. 1 according to an example embodiment.
Figure 6B:
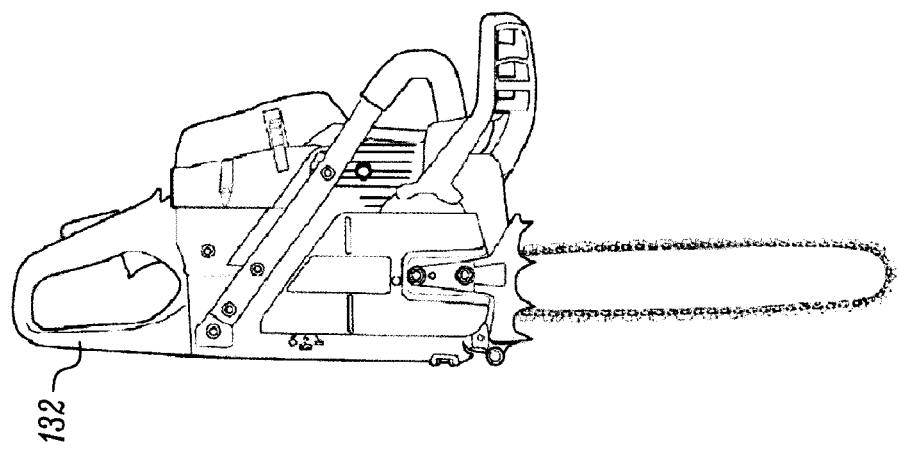
Figure 6A:
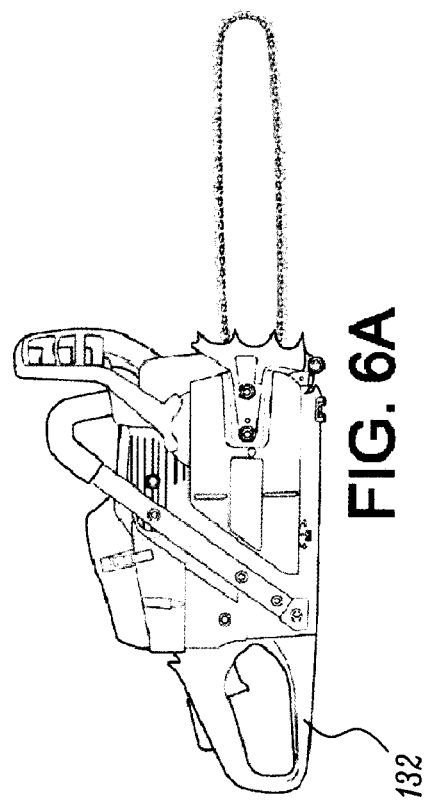
Figure 7:
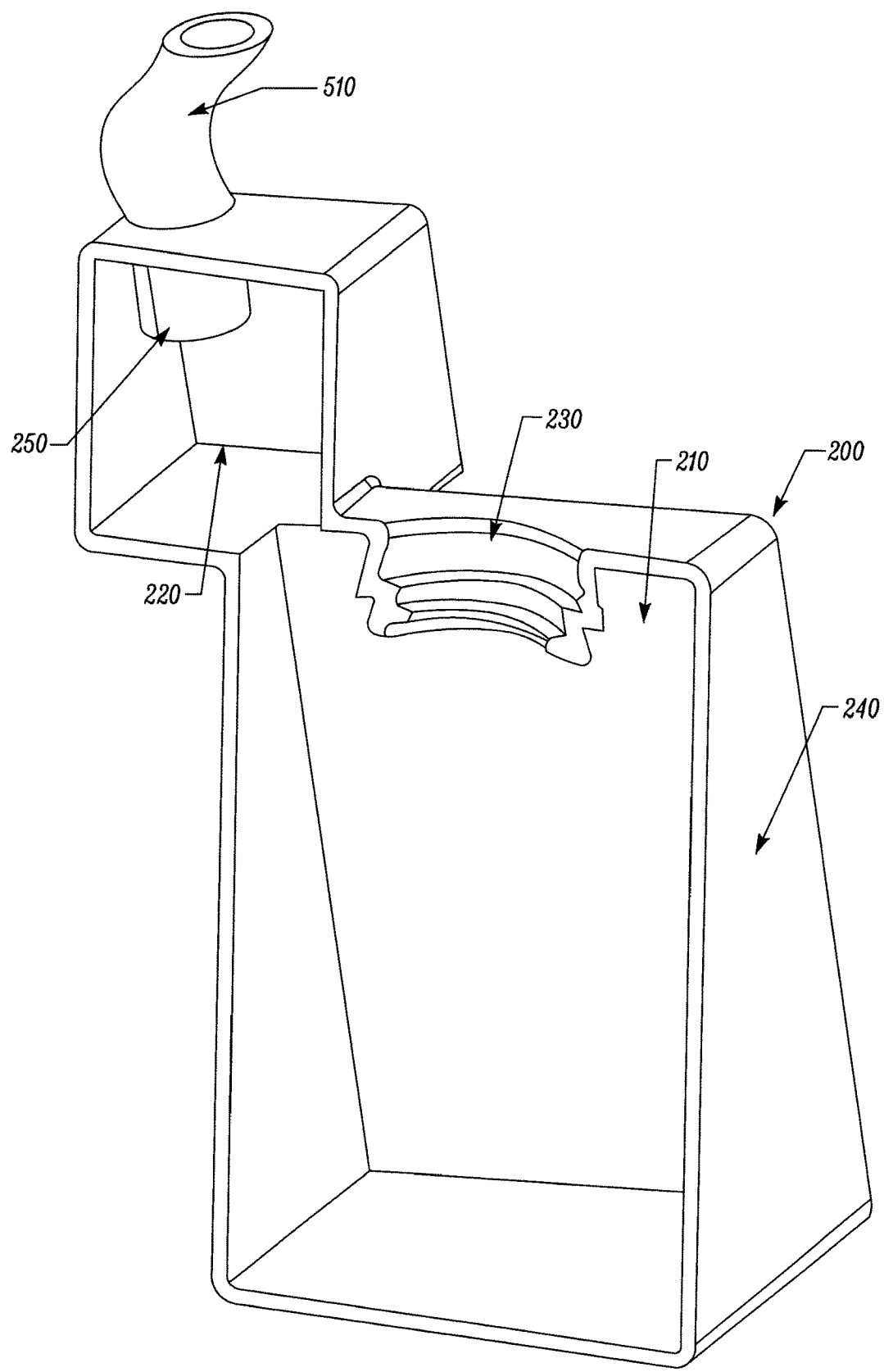
Figure 8:
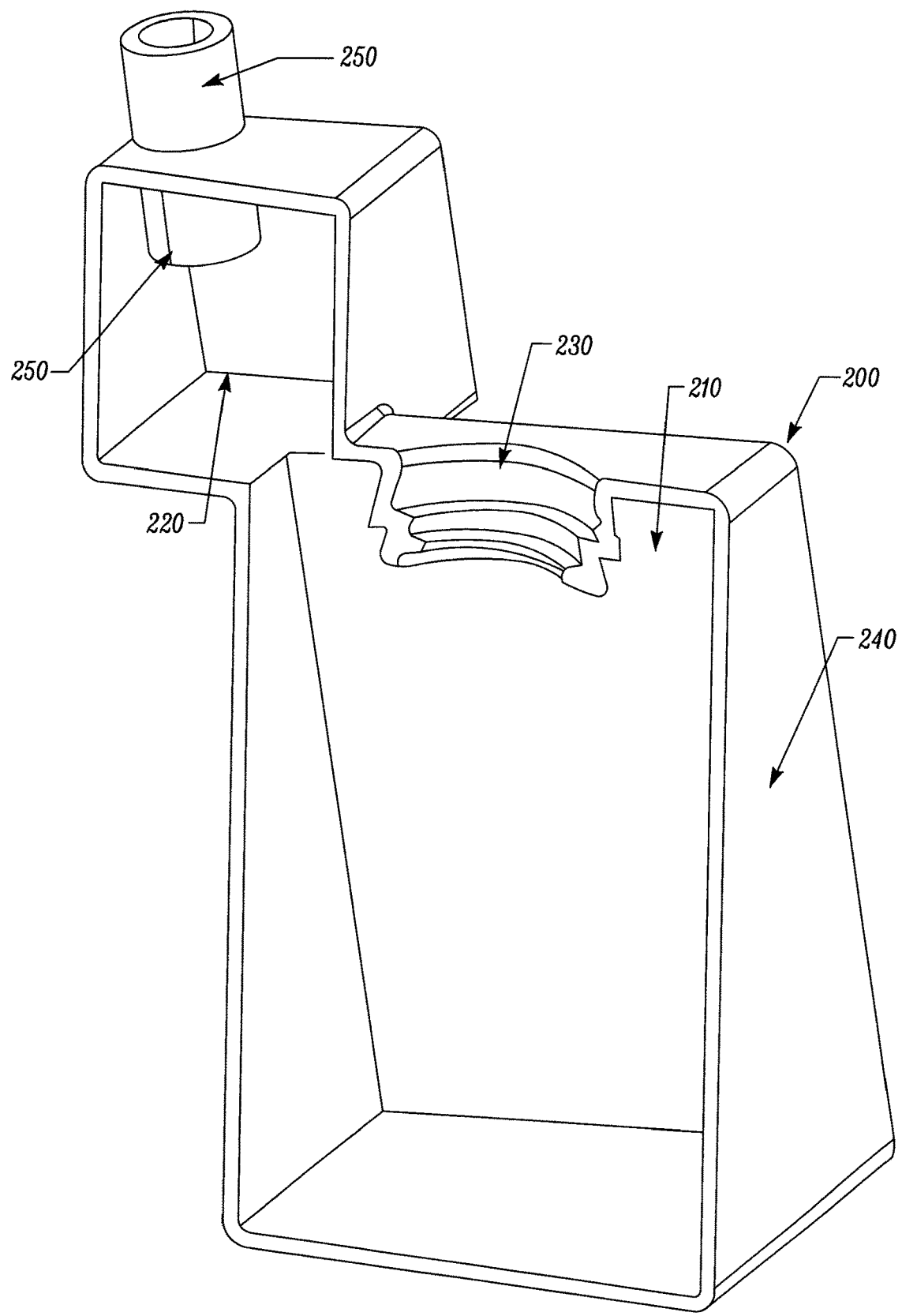
Figure 9A:
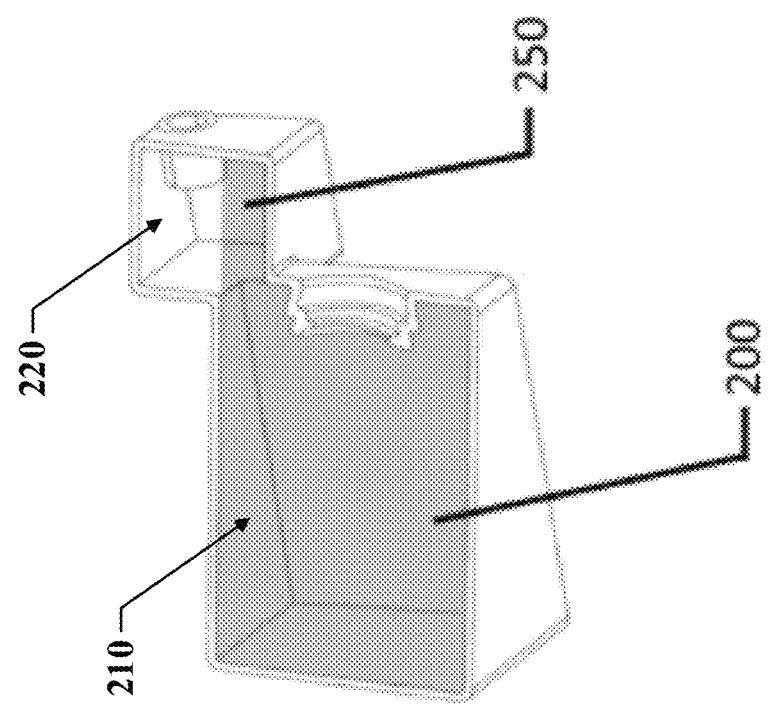
Figure 9A:
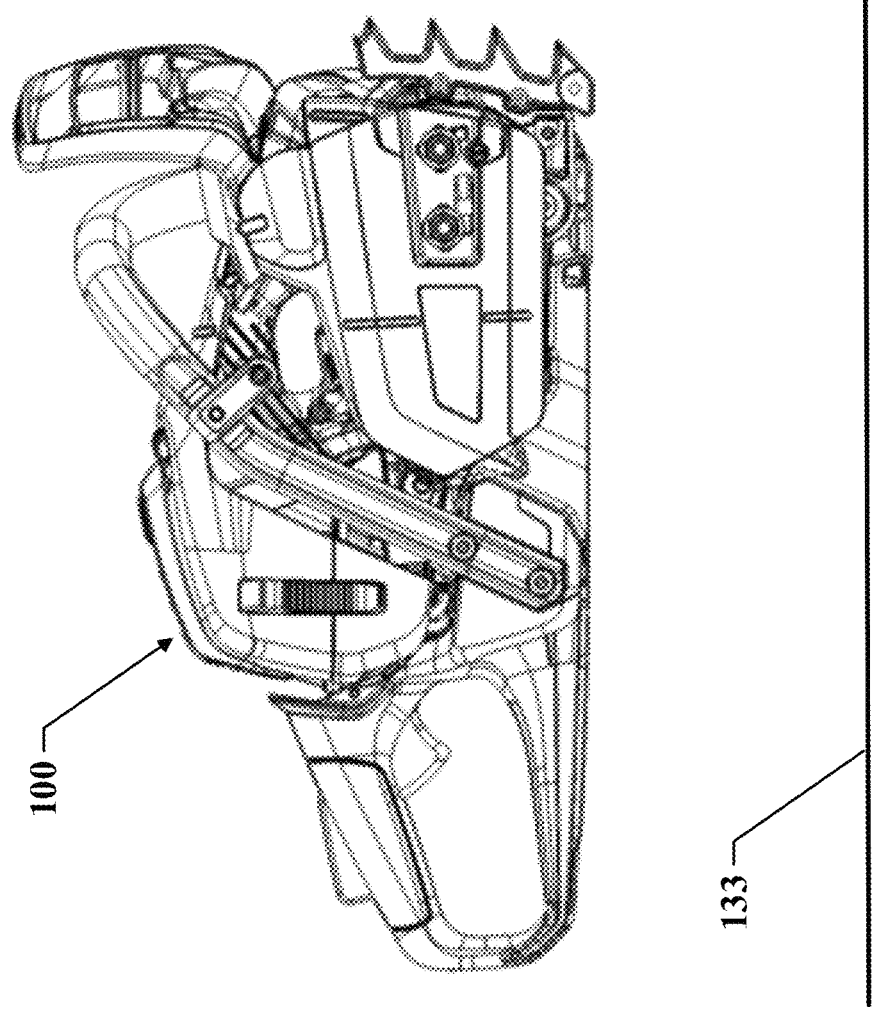
Figure 9B:
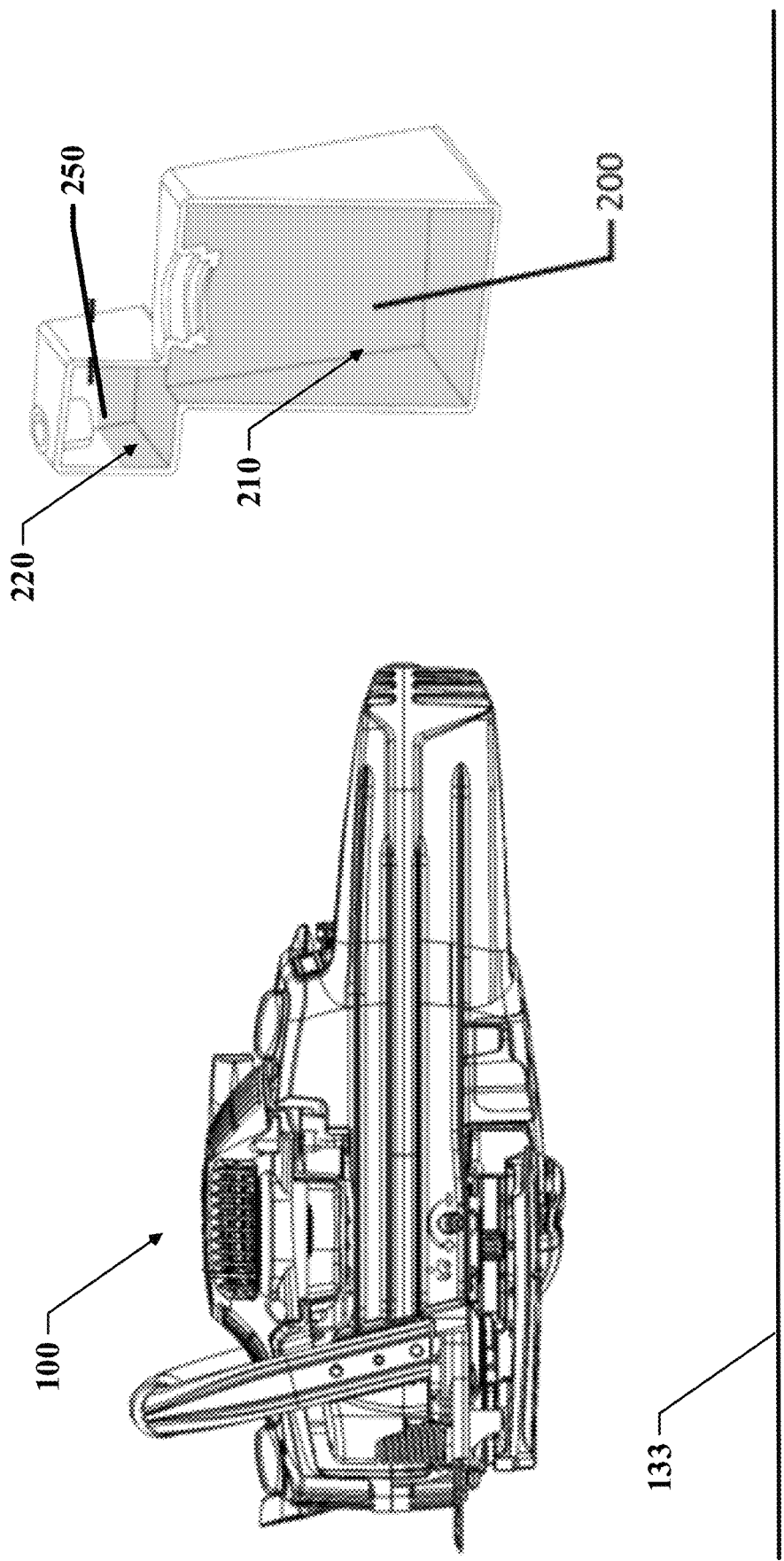
Figure 9C:
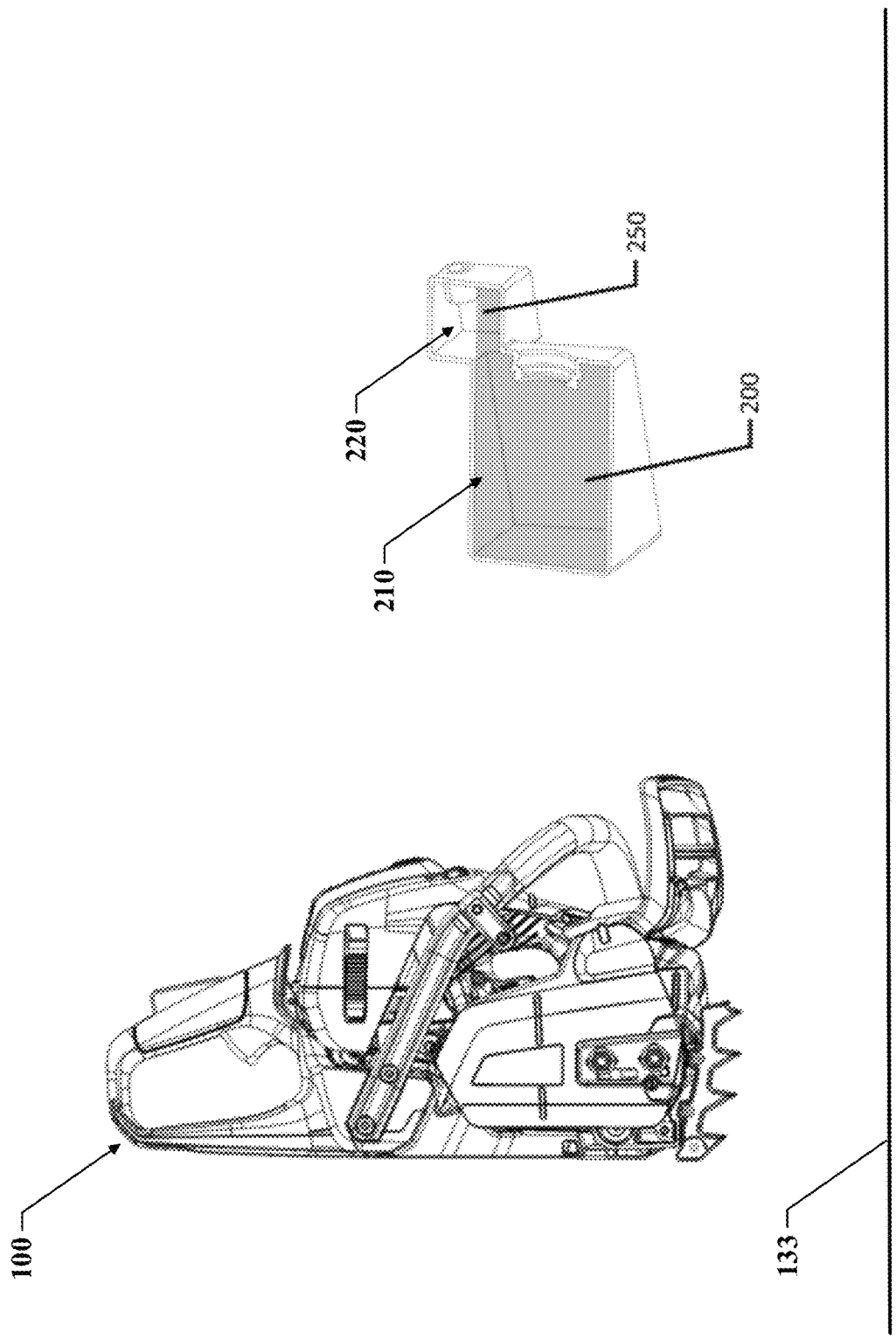

FIG. 6, which includes FIGS. 6A and 6B, shows two storage orientations of a chainsaw similar to the chainsaw of FIGS. 1 and 2 to illustrate different orientations in which an air pocket will be maintained within the air chamber of the oil reservoir according to an example embodiment;

FIG. 7 illustrates a conceptual view of one example of an oil reservoir that may be constructed in accordance with an example embodiment;

FIG. 8 illustrates a conceptual view of one example of an oil reservoir that may be constructed in accordance with an example embodiment FIG. 9, which includes FIGS. 9A-9C, show a side view of three storage orientations of a chainsaw similar to the chainsaw of FIGS. 1 and 2 and an orientation of the oil reservoir in the chainsaw in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein provide a chainsaw oil reservoir that is designed to mitigate oil leakage through the oil pump that may occur due to environmental temperature changes while the chainsaw is stored. In this regard, the oil reservoir of an example embodiment may be designed in order to accommodate temperature changes in the environment by allowing pressure within the oil chamber to be relieved via an air pocket that is provided so that air can be expelled as pressure increases instead of expelling oil through the oil pump. In an example embodiment, the oil reservoir may be provided with a main chamber for receiving oil, and an air chamber for providing an air cavity or air pocket. The air cavity or pocket may be provided at a location that is higher in elevation than the main chamber (e.g., above the maximum fill level) for multiple different orientations in which the chainsaw is likely to be stored.

FIG. 1 illustrates a perspective view of a chainsaw 100 according to an example embodiment. Meanwhile, FIG. 2 illustrates a side view of the chainsaw 100 from the opposite side of that which is shown in FIG. 1. It should be appreciated that although an example embodiment is shown and described illustrating a hand held chainsaw, example embodiments could be practiced in connection with other similar devices such as pole saws or other cutting devices that employ a chain that rotates to affect cutting, where it is advantageous to lubricate the chain for better performance.

Referring to FIGS. 1 and 2, the chainsaw 100 may include a housing 110 inside which a power unit or motor (not shown) is housed. In some embodiments, the power unit may be either an electric motor or an internal combustion engine. The chainsaw 100 may further include a guide bar 120 that is attached to housing 110 along one side thereof. A chain 122 may be driven around the guide bar 120 responsive to operation of the power unit in order to enable the chainsaw 100 to cut lumber or other materials.

The chainsaw 100 may include a front handle 130 and a rear handle 132. A chain brake and front hand guard 134 may be positioned forward of the front handle 130 to stop the movement of the chain 122 in the event of a kickback. The rear handle 132 may include a trigger 136 to facilitate control of the power unit. The housing 110 may include a fuel tank for providing fuel to the motor and a fuel tank cap 140 may provide access to the fuel tank. The housing 110 may also include or at least partially define an oil reservoir 150, access to which may be provided by an oil tank cap 152.

The oil tank cap 152 may be removed to allow the operator to pour oil into the oil reservoir 150. The oil in the oil reservoir 150 may be used to oil the chain 122 as described above. In this regard, an oil pump (not shown) may draw oil from the oil reservoir 150 and deliver the oil to the chain 122 via openings in the guide bar 120. The oil pump may be operably coupled to the power unit to receive power therefrom. In embodiments in which the power unit is an electric motor, the operable coupling may be relatively direct insofar as the oil pump may operate whenever the power unit is running (since the chain will also be moving responsive to the power unit running). However, in embodiments in which the power unit is a gasoline engine, the oil pump may be indirectly and/or selectively coupled to the power unit. In this regard, when the power unit is idling, there is no need for the oil pump to dispense oil, since the chain 122 is not turning. However, when the chain 122 is turning, it is desirable to dispense oil. Thus, for example, the oil pump may be operably coupled to the power unit via a centrifugal clutch so that when the power unit is running at a speed above engagement rpm of the centrifugal clutch and the clutch engages the chain 122 to turn, the oil pump will also be operated to dispense oil.

In some embodiments, the oil reservoir 150 may extend substantially from one side of the housing 110 to the other (e.g., from the left side to the right side) across a front portion of the chainsaw 100. As shown in FIGS. 1 and 2, the oil may be inserted on one side (e.g., the left side of the chainsaw 100) and may be dispensed to the chain 122 on the other side (e.g., the right side) of the chainsaw 100. In the context of the present application, the terms right and left side of the chainsaw 100 should be understood to be referenced relative to a "normal orientation" of the chainsaw 100 in which the longitudinal length of the chainsaw 100 extends substantially parallel to a ground plane 133 (see FIG. 9) from the rear handle 132 to the end of the guide bar 120. In the normal orientation, the end of the guide bar 120 is considered the front of the chainsaw 100, with the plane in which the guide bar 120 lies being substantially perpendicular to the ground plane 133. In this orientation, the chainsaw 100 of FIGS. 1 and 2 sits on its bottom and has the guide bar 120 on the right side and the oil tank cap 152 is on the left side of the chainsaw 100. Meanwhile, the chain brake and front hand guard 134 extends over the top of the chainsaw 100.

In some embodiments, the oil reservoir 150 may be provided with an air inlet check valve that is configured to allow air to be drawn into the oil reservoir 150 as oil is dispensed therefrom by operation of the oil pump. Without the air inlet check valve, a vacuum may be drawn in the oil reservoir 150 as oil is dispensed to the chain 122. Thus, the air inlet check valve may allow air to enter to replace dispensed oil, but may not allow any flow out of the oil reservoir 150, so that oil in the oil reservoir cannot leak out through the air inlet check valve.

To avoid or at least mitigate the possibility of oil being pushed through the oil pump due to environmental temperature changes (and therefore corresponding pressure changes within the fixed volume defined by the oil reservoir 150), some example embodiments may employ a oil reservoir structure that is configured to provide an air pocket that will exist in a particular chamber designed for providing the air pocket. By providing a separate chamber for the air pocket, a mechanism may be provided by which to release or absorb some increases in pressure within the oil reservoir 150 that may occur, for example, as temperature increases in the environment in which the chainsaw 100 is stored. As will be discussed in greater detail below, the oil reservoir 150 of some embodiments may be provided with pressure relief capability via a valve configured to relieve pressure. However, in some embodiments, the air pocket itself may mitigate pressure changes or a small orifice may be provided therein to assist relative to equalizing pressure with the external environment.

Figure 3:
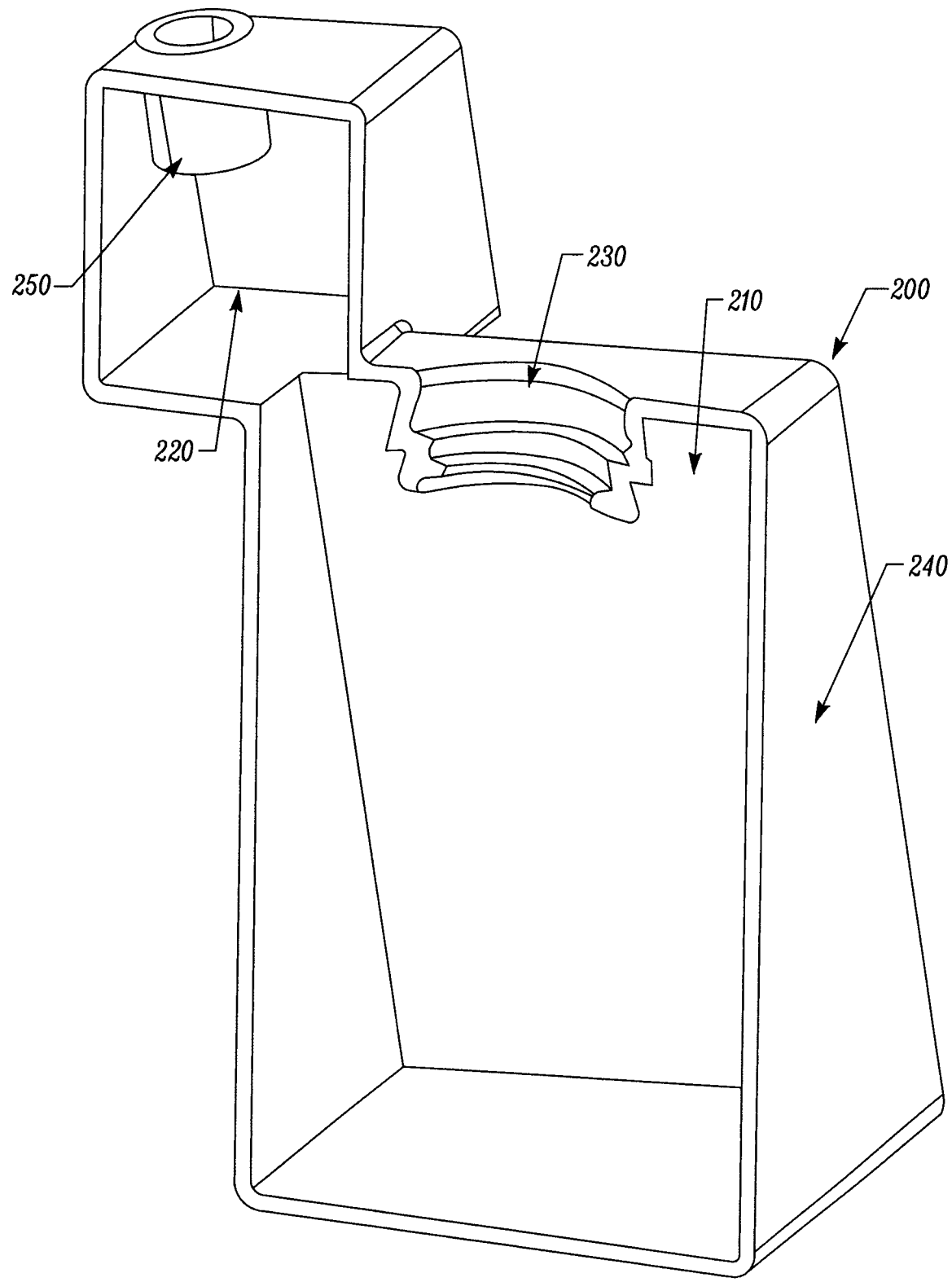
FIG. 3 illustrates a conceptual view of one example of an oil reservoir that may be constructed in accordance with an example embodiment.

FIG. 3 illustrates a conceptual view of one example of an oil reservoir 200 that may be constructed in accordance with an example embodiment. The oil reservoir 200 may be a conceptual view of the inner construction of the oil reservoir 150 of FIGS. 1 and 2. As shown in FIG. 3, the oil reservoir 200 may include a main chamber 210 and an air chamber 220. The main chamber 210 may be formed adjacent to and distinct from the air chamber 220. In other words, the air chamber 220 may have some distinctive characteristics that make it easily distinguishable from the main chamber 210. In some embodiments, the main chamber 210 may be a separate chamber from the air chamber 220 and they may share all or a portion of one or more walls. In such an example, the shared wall(s) may be at least partially open to connect the separate chambers as shown in FIG. 3. However, in an alternative embodiment, the air chamber 220 may be a part of the same chamber as the main chamber 210, but may have distinguishing characteristics such as shape. For example, the main chamber 210 may be formed in a tank or container shape and the air chamber 220 may be an elongated corner portion of the main chamber 210.

Figure 4:
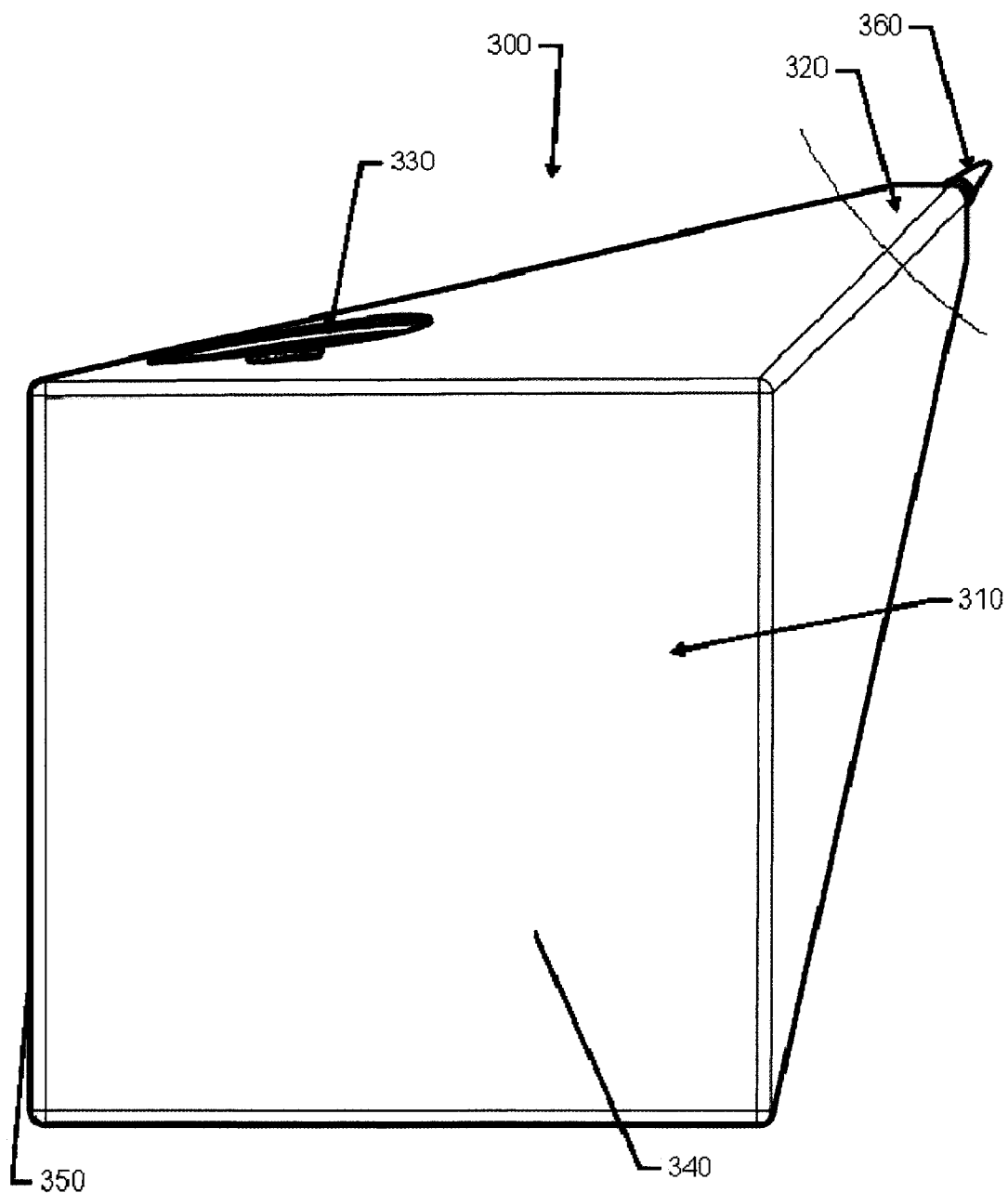
FIG. 4 illustrates an oil reservoir having a single chamber in which the main chamber forms a majority portion of the oil reservoir, and the air chamber is an elongated corner of the oil reservoir, but is still part of the same overall structure of the oil reservoir as the main chamber according to an example embodiment.

FIG. 4 illustrates an oil reservoir 300 having a single chamber in which the main chamber 310 forms a majority portion of the oil reservoir 300, and the air chamber 320 is an elongated corner of the oil reservoir 300, but is still part of the same overall structure of the oil reservoir 300 as the main chamber 310. However, the narrow and elongated nature of the air chamber 320 maintains a distinctly formed portion of the oil reservoir 300 that is adjacent to the main chamber 310. The embodiment of FIG. 4 is shown oriented for filling with oil (i.e., so that the capped opening 330 is oriented upward). As can be appreciated from FIG. 4, the air chamber 320 is formed distinctly and adjacent to the main chamber 310 in such a way as to allow an air pocket to form in the air chamber 320 while the main chamber 310 is filled to maximum capacity (i.e., until oil would leak out of the capped opening 330 if more is added). However, based on the construction of the oil reservoir 300, even if the oil reservoir 300 is tilted to lie on bottom face 340, or to lie on front face 350, the air chamber 320 will still maintain the air pocket, and air pressure may be released through valve 360 if a pressure set point of the valve 360 is exceeded.

Referring again to FIG. 3, the main chamber 210 may generally be larger than the air chamber 220, and may be provided receive oil via a capped opening 230. Note that the cap is not shown in this conceptual view, but it should be appreciated that the capped opening 230 will be capable of receiving a removable cap. The cap will be removed for providing oil into the main chamber 210 and will be replaced thereafter to prevent leakage of oil from the main chamber 210. The air chamber 220 may be formed adjacent to and distinct from the main chamber 210 such that, when the main chamber 210 is completely full of oil, the air chamber 220 does not receive oil, but is instead filled with air. In the example of FIG. 3, the air chamber 220 is at a higher elevation than the main chamber 210. More specifically, when the main chamber 210 is filled completely so that the oil level is at the capped opening 230, oil cannot be further added to fill the air chamber 220. Thus, the air chamber 220 remains filled with air when the main chamber 210 is completely filled with oil by virtue of the elevation of the air chamber 220 being higher than that of the main chamber 210 (at least when the oil reservoir 200 is being filled with oil, and is therefore in an orientation that supports filling of the main chamber 210).

As can be appreciated from FIG. 3, the air chamber 220 may be configured to define a space for an air pocket to be formed and at least partially maintained when the oil reservoir 200 is filled to the maximum level and when the oil reservoir 200 is shifted to be in at least one other orientation. As such, for example, given the orientation shown in FIG. 3, the air chamber 220 may be formed such that the air chamber 220 has a higher elevation than the main chamber 210 during filling of the main chamber 210 with oil, and when the oil reservoir is tipped to at least one other orientation. In this example, if the oil reservoir 200 is tilted to lie on side 240, the air chamber 220 is still at a higher elevation than the main chamber 210. Thus, the air chamber 220 may maintain the air pocket formed therein. Of note, the air pocket is maintained in the air chamber 220 even if a small amount of oil should enter the air chamber 220.

In an example embodiment, the oil reservoir 200 may further include at least one breather structure, such as one or two breather structures, that may be disposed in the air chamber 220. The breather structure may include a valve housing 250 which may house a pressure relief valve such as a check valve. The check valve may be set to allow pressure to be relieved from the air chamber 220 when the pressure in the air chamber 220 exceeds a predetermined value. However, before the predetermined value is reached, the check valve may remain shut. Meanwhile, the check valve may not allow any flow in the reverse direction into the air chamber 220. In an example embodiment, the check valve may relieve pressure inside the casing of the chainsaw. However, in some cases, the check valve may be constructed to relieve pressure outside of the casing. Since it is possible that the chainsaw may be oriented during storage in an orientation that causes the oil reservoir 200 to fill with oil (e.g., upside down), the valve housing 250 may be in communication with a duct, hose or other conduit by which to transfer any fluid that is released through the check valve to a particular location relative to the chainsaw (e.g., the bottom thereof). Instead of a check valve a bi-directional valve may be employed.

FIGS. 7 and 8 illustrate conceptual views of examples of oil reservoirs 200 that may be constructed in accordance with example embodiments. The breather structure may define a fluid passage connecting the interior of the air chamber 220 to a distal end of the breather structure and may include a pipe, duct, hose or other conduit. The valve may be provided in the fluid passage for controlling flow through the passage. Preferably, the valve is provided at a distance along the fluid passage from the air chamber 220. This arrangement is favorable since the valve is then further separated from the main chamber 210, and from the oil, and even less subject to oil or oil mist. The valve may be a check valve in the form of either a one-way air inlet valve or a one-way pressure relief valve, or a bi-directional valve. Further, the breather structure may be mounted to the air chamber 220 and preferably extends so as to project beyond the surrounding exterior surface of the air chamber 220. Preferably, the valve is located at a distal end of the breather structure relative to the air chamber 220, or at least closer to the distal end than to the air chamber 220 along the fluid passage, wherein the distal end of the fluid passage may be open to ambient air. The distal end may be located inside the casing of the chainsaw, such as at a bottom of the chainsaw. Preferably, the valve is provided at a location lower in elevation than the position where the fluid passage meets the interior of the air chamber 220 in a normal upright orientation of the chainsaw. The normal upright orientation of the chainsaw being the orientation of the chainsaw when it is resting with its underside in contact with a horizontal surface. Suitably, the breather structure may include a flexible hose of a rubber or plastic material. In one embodiment (not illustrated), two or more breather structures may be provided, so as to form at least two fluid passages, such as two fluid passages. As an alternative (also not illustrated) the breather structure may be split a distance along the fluid passage from the air chamber 220 into two or more separate fluid passages, such as a first and a second fluid passage, of which at least one may be provided with the valve. Preferably, in case of two separate fluid passages (or in case of two passages resulting from said split), each one of the two fluid passages is provided with a check valve, of which a first (air inlet valve) may be a check valve only allowing fluid flow in a direction towards the oil reservoir 200, and the other one (pressure relief valve) only allowing fluid flow in a direction away from the oil reservoir 200. In the embodiment according to FIG. 7, the breather structure includes a hose 510 projecting from surrounding surface of the air chamber 220. In FIG. 8 the breather structure includes a housing 250 which has been extended such that it includes a pipe (also denoted 250) projecting beyond surrounding exterior surface of the air chamber 220, wherein the valve is preferably located in the fluid passage of the pipe and at a distance from the air chamber.

Preferably, the breather structure is arranged, i.e. located and/or formed, such that when a longitudinal length of the chainsaw 100 is oriented substantially parallel to a ground plane 133 (see FIG. 9) and a top of the chainsaw 100 is oriented upward, the valve is positioned higher in elevation than a maximum oil level of the main chamber 210 (see FIG. 9A). Preferably, the breather structure is arranged, i.e. located and/or formed, such that when a longitudinal length of the chainsaw 100 is oriented substantially perpendicular to a ground plane 133 and a rear handle of the chainsaw 100 is oriented upward, the valve is positioned higher in elevation than a maximum oil level of the main chamber 210 (see FIG. 9C). Preferably, the breather structure is arranged, i.e. located and/or formed, such that when a longitudinal length of the chainsaw 100 is oriented substantially parallel to a ground plane 133 and a side of the chainsaw 100 on which a fill opening for the oil reservoir 200 is oriented upward, the air chamber 220 is positioned higher in elevation than a maximum oil level of the main chamber 210 (see FIG. 9B). Preferably, the breather structure is arranged, i.e. located and/or formed, such that the valve is positioned higher in elevation than a maximum oil level of the main chamber 210 when the chainsaw 100 is stored in each of at least two different orientations, a longitudinal length of the chainsaw 100 in one of the at least two different orientations being substantially perpendicular to a longitudinal length of the chainsaw 100 in the other of the at least two different orientations.

In some embodiments, the pressure set point (e.g., the predetermined value) of the check valve may be selected such that the check valve opens to relieve pressure at a pressure that is lower than a pressure that would otherwise push oil through the oil pump and cause leakage of oil due to temperature variation as described above. Thus, in some embodiments, the pressure set point of the check valve may be relatively low. In some embodiments, the pressure set point of the check valve may be set to enable the check valve to resist the weight of the oil that may encounter the check valve in a situation where the chainsaw is oriented so that the air chamber 220 fills with oil (e.g., if the chainsaw is positioned upside down). However, any desirable pressure set point can be selected. Furthermore, it should be noted that in some embodiments, the oil reservoir 200 may also have a check valve provided to allow air to be drawn into the oil reservoir 200 when pressure drops due to oil distribution. This may prevent drawing a vacuum in the oil reservoir 200 as the oil therein is distributed. In embodiments that employ an inlet check valve, it may be possible to locate the inlet check valve and the pressure relief check valve proximate to each other (e.g., both in the valve housing 250). Moreover, in some cases, a bi-directional valve may be employed in the valve housing 250 and the bi-directional valve may include one set point for actuation to relieve pressure and another set point for actuation to draw air into the air chamber 220. The respective set points may be set to any desirable values.

Figure 5A:
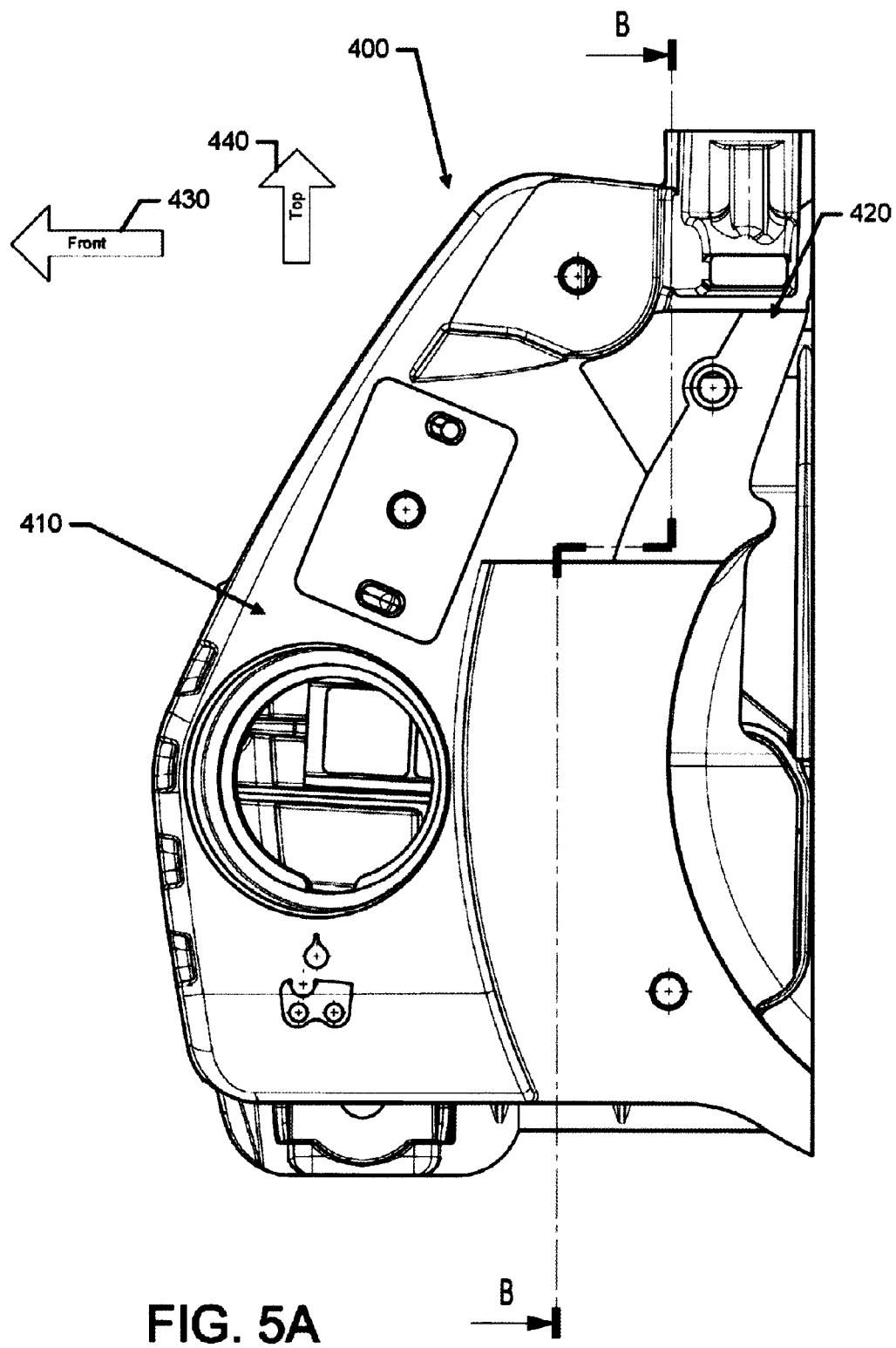
FIG. 5A illustrates a side view of an oil reservoir according to an example embodiment.
Figure 5B:
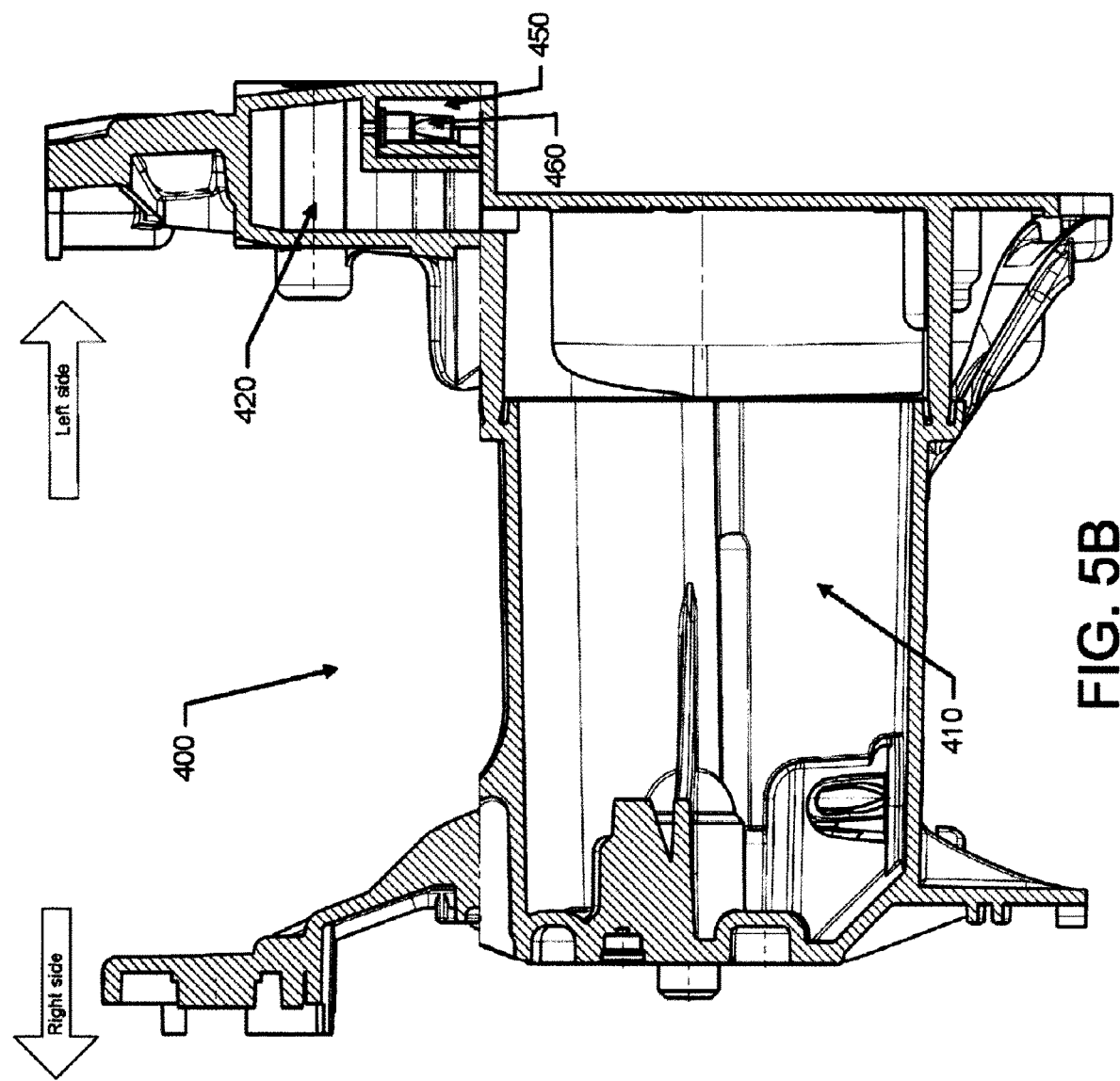
FIG. 5B illustrates a cross section view along line B-B' of the oil reservoir of FIG. 5A according to an example embodiment.

FIG. 5, which includes FIGS. 5A and 5B, illustrates various views of an oil reservoir 400 of an example embodiment. In this regard, FIG. 5A illustrates a side view of the oil reservoir 400, which may be an example of the oil reservoirs 150 and 200 of FIGS. 1, 2 and 3. FIG. 5B illustrates a cross section view along line B-B' of the oil reservoir 400 of FIG. 5A. As shown in FIG. 5, the oil reservoir includes a main chamber 410 and an air chamber 420. The air chamber 420 is adjacent to and distinct from the main chamber 410 and is provided at a higher elevation than the main chamber 410 in the orientation pictured in FIG. 5.

It should be appreciated that the image of FIG. 5A shows the left side of the chainsaw on which the oil reservoir 400 is mounted. Thus, arrow 430 points in the direction of the front of the chainsaw and arrow 440 points in the direction of the top of the chainsaw. Meanwhile, although the main chamber 410 extends from the left side of the chainsaw to the right side of the chainsaw, the air chamber 420 is only located at the far left side of the oil reservoir 400, as seen in FIG. 5B. Moreover, at least a portion of the air chamber 420 is farther to the left than the main chamber 410. Thus, in this upright orientation of FIG. 5, the air chamber 420 maintains a higher elevation than the main chamber 410. However, if the chainsaw is tipped onto its front so that the front of the chainsaw is oriented downward, the fact that the air chamber 420 is farther rearward than the main chamber 410 means that the air chamber 420 will still have a higher elevation than the main chamber 410. Additionally, if the chainsaw is tipped on its side so that the right side of the chainsaw is oriented downward, the fact that the air chamber 420 is farther left than the main chamber 410 means that the air chamber 420 will still have a higher elevation than the main chamber 410. As such, in at least three different possible chainsaw orientations (or oil reservoir 400 orientations), the air chamber 420 has a higher elevation than the main chamber 410. In other words, in at least three different possible chainsaw orientations, the air chamber 420 may maintain an air pocket therein, even when the main chamber 410 is filled with oil to the maximum level.

The example of FIG. 5 also includes a valve chamber 450 into which a pressure relief valve 460 (e.g., a check valve) may be provided as described above. Given that the air chamber 420 remains at a higher elevation (e.g., above the maximum oil level) than the main chamber 410 in each of at least three orientations of the oil reservoir 400, the air chamber 420 will tend to include an air pocket that can relieve pressure through the relief valve 460 responsive to temperature changes that cause expansion of fluids in the oil reservoir 400 and therefore cause pressure increases in the oil reservoir 400. As indicated above, the relief valve may be coupled to a hose, conduit or other means by which any fluid leaking from the relief valve 460 may be transferred to a location outside of the casing.

FIG. 6, which includes FIGS. 6A and 6B, shows two storage orientations of a chainsaw similar to the chainsaw 100 of FIGS. 1 and 2 to illustrate different orientations in which an air pocket will be maintained within the air chamber of the oil reservoir. In FIG. 6A, the chainsaw is stored sitting on its bottom and the air chamber of the oil reservoir would maintain an air pocket therein. In FIG. 6B, the chainsaw is stored with the blade down and rear handle 132 oriented upward. The chainsaw may be suspended by the rear handle 132 to achieve this orientation. However, other storage means may also be used to achieve this orientation. In any case, however, the air pocket will be maintained within the air chamber of the oil reservoir in this configuration as well. Additionally, the chainsaw may be stored on its side (e.g., with the oil tank cap oriented upward). In this orientation as well, the air pocket will be maintained within the air chamber of the oil reservoir.

In an example embodiment, a chainsaw is provided. The chainsaw may include a power unit, a bar, a chain operably coupled to the bar to rotate around the bar responsive to drive power from the power unit, an oil pump operably coupled to the power unit to deliver oil to the chain, and an oil reservoir configured to hold oil for delivery to the chain via the oil pump. The oil reservoir may include a main chamber to receive the oil and an air chamber. The air chamber may be formed adjacent to and distinct from the main chamber. The air chamber is configured to define a space for an air pocket. In some embodiments, the oil reservoir itself may be provided for inclusion in or attachment to a chainsaw.

The chainsaw (or oil chamber) of some embodiments may include additional features that may be optionally added either alone or in combination with each other. For example, in some embodiments, (1) the air chamber may include a check valve disposed to relieve pressure from the air chamber. Additionally or alternatively, (2) the oil reservoir may be formed such that when a longitudinal length of the chainsaw is oriented substantially parallel to a ground plane and a top of the chainsaw is oriented upward, the air chamber is positioned above a maximum oil level of the main chamber (i.e., at an elevation higher than the main chamber). In some cases, (3) the oil reservoir may be formed such that when a longitudinal length of the chainsaw is oriented substantially perpendicular to a ground plane and a rear handle of the chainsaw is oriented upward, the air chamber is positioned above a maximum oil level of the main chamber. Additionally or alternatively, (4) the oil reservoir may be formed such that when a longitudinal length of the chainsaw is oriented substantially parallel to a ground plane and a side of the chainsaw on which a fill opening for the oil reservoir is oriented upward, the air chamber is positioned above a maximum oil level of the main chamber. In an example embodiment, (5) the oil reservoir may be formed such that the air chamber is positioned above a maximum oil level of the main chamber when the chainsaw is stored in each of at least two different orientations, and a longitudinal length of the chainsaw in one of the at least two different orientations may be substantially perpendicular to a longitudinal length of the chainsaw in the other of the at least two different orientations.

In some embodiments, any or all of (1) to (5) may be employed, and the check valve may be disposed to relieve pressure from the air chamber of the oil reservoir to a location inside a casing of the chainsaw. Additionally or alternatively, a duct may be provided to guide fluid released from the check valve to a bottom of the chainsaw. In an example embodiment, any or all of (1) to (5) may be employed, and the check valve may be disposed to relieve pressure from the air chamber of the oil reservoir to a location outside a casing of the chainsaw. In some embodiments, any or all of (1) to (5) may be employed, and the air chamber may include only one opening, and the opening connects the air chamber to the main chamber. Additionally or alternatively, the air chamber may include a plurality of openings, one of which connects the air chamber to the main chamber. In some embodiments, any or all of (1) to (5) may be employed, and the air chamber may include a bi-directional valve disposed to have a first set point for relieving pressure from the air chamber and a second set point for allowing air into the air chamber responsive to distribution of oil to the chain.

The various configurations of the breather structure as described in connection to the conceptual views of FIGS. 3, 7 and 8 may advantageously be applied to the embodiments illustrated in FIGS. 4, 5A-B.

Accordingly, some example embodiment may provide a relatively reliable mechanism by which to control pressure in an oil reservoir to prevent oil leakage through the oil pump.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

The invention claimed is:

1. A chainsaw comprising:
   a power unit;
   a bar;
   a chain configured to rotate around the bar responsive to drive power from the power unit; and
   an oil reservoir and the power unit arranged in a housing of the chainsaw, the oil reservoir being configured to hold oil for delivery to the chain,
   wherein the power unit is configured to enable the delivery of the oil to the chain when the chain is rotating,
   wherein the oil reservoir includes a main chamber and an air chamber, the air chamber being formed adjacent to and distinct from the main chamber,
   wherein the main chamber is configured to receive the oil,
   wherein the air chamber is configured to define a space for an air pocket, and
   wherein a portion of the air chamber is positioned higher in elevation than an entirety of the main chamber in each of at least two different orthogonal orientations of the chainsaw,
   wherein in each of the at least two different orthogonal orientations, a different face of the chainsaw is oriented upward,
   wherein in a first of the at least two different orthogonal orientations of the chainsaw, the chainsaw is in a normal orientation,
   wherein in the normal orientation, a longitudinal length of the bar of the chainsaw is oriented parallel to a horizontal surface,
   wherein the oil reservoir includes a breather structure projecting beyond a surrounding exterior surface of the air chamber and defining a fluid passage communicating with an interior of the air chamber, and
   wherein the fluid passage is provided with a valve for controlling fluid flow through the fluid passage, and the valve is located a distance from the air chamber along the fluid passage.

2. The chainsaw of claim 1, wherein in a second of the at least two different orthogonal orientations of the chainsaw, the longitudinal length of the bar of the chainsaw is oriented perpendicular to the horizontal surface such that the bar is positioned closer to the horizontal surface than the power unit.

3. The chainsaw of claim 1, wherein the breather structure is arranged such that the valve is positioned higher in elevation than a maximum oil level of the main chamber when the chainsaw is stored in each of the at least two different orthogonal orientations, a longitudinal length of the chainsaw in one of the at least two different orthogonal orientations being perpendicular to a longitudinal length of the chainsaw in the other of the at least two different orientations.

4. The chainsaw of claim 1, wherein the power unit is electrically powered or gasoline powered.

5. The chainsaw of claim 1, wherein only one opening connects the air chamber to the main chamber.

6. The chainsaw of claim 1, wherein the air chamber includes a plurality of openings, one of which connects the air chamber to the main chamber.

7. The chainsaw of claim 1, wherein an underside of the chainsaw is proximate the horizontal surface when the chainsaw is in the normal orientation.

8. A chainsaw oil reservoir of a chainsaw configured to provide chain oil to the chainsaw, the oil reservoir comprising:
   a main chamber configured to receive and store the chain oil; and
   an air chamber formed adjacent to and distinct from the main chamber, the air chamber being in communication with the main chamber to define a space for an air pocket,
   wherein a portion of the air chamber is configured to be positioned higher in elevation than an entirety of the main chamber in at least three different orthogonal orientations of the chainsaw,
   wherein in each of the at least three different orthogonal orientations, a different face of the chainsaw is oriented upward,
   wherein in a first of the at least three different orthogonal orientations of the chainsaw, the chainsaw is in a normal orientation,
   wherein in the normal orientation, a longitudinal length the chainsaw is oriented parallel to a horizontal surface,
   wherein the oil reservoir further comprises a breather structure projecting beyond a surrounding exterior surface of the air chamber and defining a fluid passage communicating with an interior of the air chamber, and
   wherein the fluid passage is provided with a valve for controlling fluid flow through the fluid passage, and the valve is located a distance from the air chamber along the fluid passage.

9. A chainsaw comprising:
   a power unit;
   a bar;
   a chain operably configured to rotate around the bar responsive to drive power from the power unit; and an oil reservoir and the power unit arranged in a housing of the chainsaw, the oil reservoir being configured to hold oil for delivery to the chain, wherein the power unit is configured to enable the delivery of the oil to the chain when the chain is rotating, wherein the oil reservoir includes a main chamber and an air chamber, the air chamber being formed adjacent to the main chamber, wherein the main chamber is configured to receive the oil, wherein the air chamber is configured to define a space for an air pocket and includes a valve configured to relieve pressure from the air chamber, and wherein a portion of the air chamber is positioned above an entirety of the main chamber in each of at least two different orthogonal orientations of the chainsaw, wherein in each of the at least two different orthogonal orientations, a different face of the chainsaw is oriented upward, wherein in a first of the at least two different orthogonal orientations of the chainsaw, the chainsaw is in a normal orientation, and wherein in the normal orientation, a longitudinal length of the bar of the chainsaw is oriented parallel to a horizontal surface.

10. The chainsaw of claim 9, wherein the valve is a check valve configured to relieve pressure from the air chamber of the oil reservoir to a location inside a casing of the chainsaw.

11. The chainsaw of claim 9, wherein the valve is a check valve configured to relieve pressure from the air chamber of the oil reservoir to a location outside a casing of the chainsaw.

12. The chainsaw of claim 9, wherein the valve is a check valve configured to relieve pressure from the air chamber of the oil reservoir to a location inside a casing of the chainsaw, and wherein a duct or hose is provided to guide fluid released from the check valve to a bottom of the chainsaw.

13. The chainsaw of claim 9, wherein the valve is a bi-directional valve configured to have a first set point for relieving pressure from the air chamber and a second set point for allowing air into the air chamber responsive to distribution of the oil to the chain.

14. The chainsaw of claim 9, wherein in a second of the at least two different orthogonal orientations of the chainsaw, the longitudinal length of the bar of the chainsaw is oriented perpendicular to the horizontal surface such that the bar is positioned closer to the ground plane than the power unit.

15. The chainsaw of claim 9, wherein an underside of the chainsaw is proximate the horizontal surface when the chainsaw is in the normal orientation.

* * * * *